Patented Mar. 4, 1930

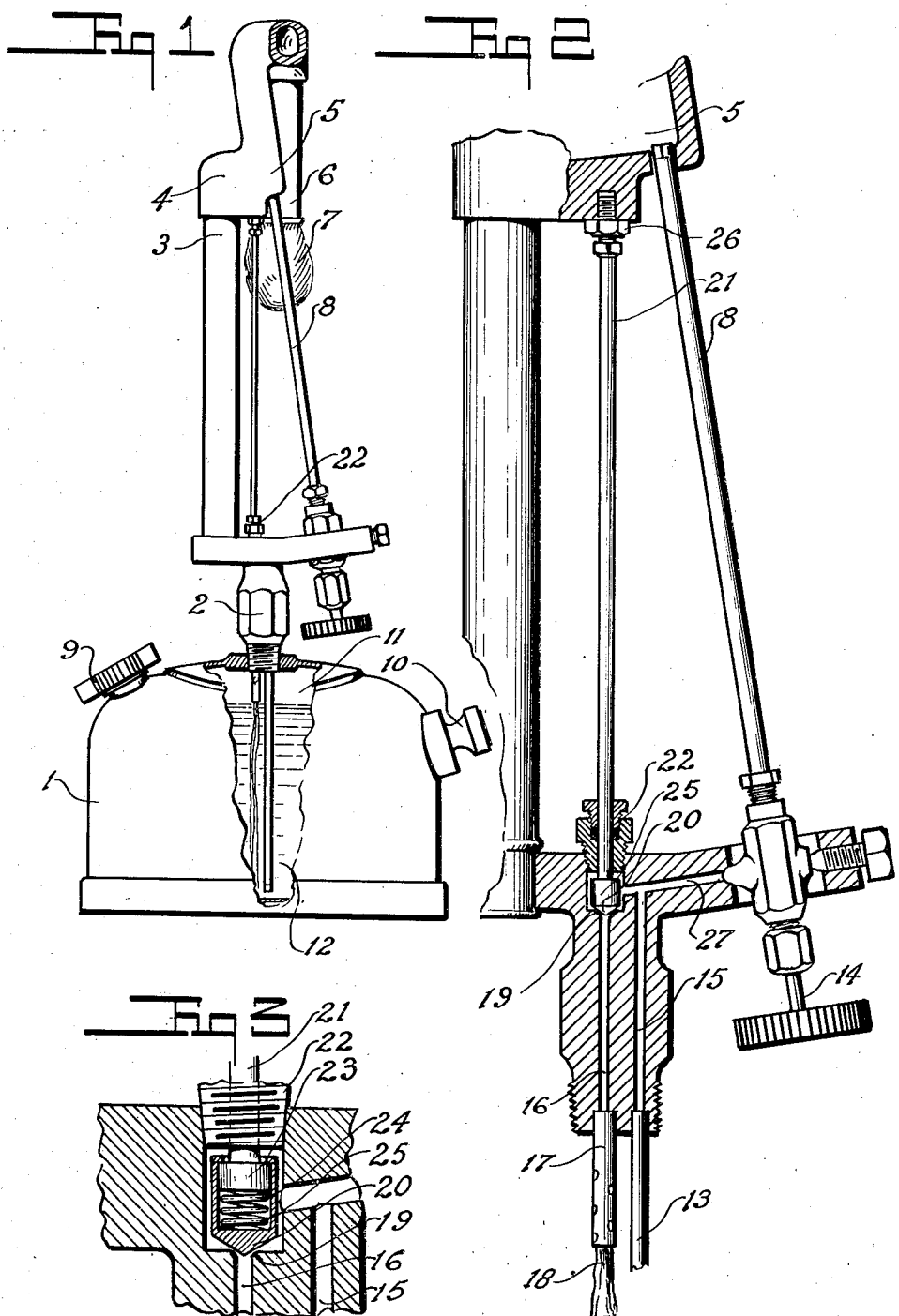

1,749,629

UNITED STATES PATENT OFFICE

WILLIAM C. COLEMAN, OF WICHITA, KANSAS, ASSIGNOR TO COLEMAN LAMP AND STOVE CO., OF WICHITA, KANSAS, A CORPORATION OF KANSAS

APPARATUS FOR BURNING FUEL

Application filed December 30, 1927. Serial No. 243,656.

This invention relates to a method and apparatus for controlling the flows of two fluids of different specific gravities.

Liquid hydrocarbon, such as gasoline, is extensively used for heating and lighting. A vaporizing generator communicates a tank or liquid containing receptacle with a burner. The liquid in the receptacle is usually under pressure due to air being pumped into the receptacle above the liquid level. The air has an affinity for the lighter ends of the hydrocarbon fuel, such as gasoline.

My invention contemplates a novel apparatus for carrying out the method of initially utilizing the air as a preheating agent for the generator and cutting off the gaseous fuel or carbureted air by the heat of the burner as soon as the generator becomes hot enough to vaporize the liquid. According to my invention, the carbureted air will initially flow to the burner to the exclusion of the liquid, but so soon as there is enough heat generated by the burner to cause the generator to heat the liquid to vaporizing temperature, the carbureted air will cease to flow and thereafter the liquid will be forced into the generator by the pressure within the tank or receptacle.

In order to understand my invention, reference should be had to the accompanying drawings in which:

Fig. 1 is a fragmentary view of a lamp of known construction to which my invention is applied.

Fig. 2 is enlarged view of the air supplying tube, the generator and a thermostat for closing off the carbureted air supply, the supporting bracket being shown in section and Fig. 3 is an enlarged view of the air shut-off valve.

The font 1, the bracket fitting 2 screwed in the top of the font, the air supply tube 3 supplying the atmosphere with the burner 4, the mixing chamber 5, the burner supports 6, the burner or mantle 7, the generator 8, the filler plug 9 and the pump 10 in a general way have all been used prior to my invention. In such a lamp, the pressure of the air in the space 11 forces the liquid 12 up through the supply pipe 13 into the generator 8 so that the needle valve controlled by the stem 14 can supply the proper amount of liquid to the generator to be vaporized before it enters the mixing chamber 5 to combine with the air supplied through pipe 3 to be used at the burner 7. I have shown the pipe 13 communicating with the generator 8 through a port 15. In addition, I have provided a carbureted air port 16 communicating with a perforate tube 17 in the air space 11. The tube 17 carries a wick 18 which, due to capillary attraction, will be saturated with liquid hydrocarbon. The port 16 has a valve seat 19 for the valve 20 on a stem 21 surrounded by a stuffing-box 22. The valve 20 is sleeved on stem 21, provided with an enlargement or head 23 against which one end of a coil spring 24 abuts, the other end of the spring abutting against the bottom of the chamber 25 so as to act as a cushion when the stem 21 expands. The advantage of this is that the valve will not be jammed too hard against the valve seat. The valve stem 21 is anchored at 26 to the mixing chamber and adjacent to the burner 7 of which there are usually two to a lamp.

Assuming that the valve in the generator is closed; that there is gasoline or other appropriate liquid fuel in the tank 1 under pressure, the valve 20 at this time being unseated, the pressure in the chamber 25 and the ports 15 and 16, as well as in the passage-way 27, being equalized by the unseating of the valve in the generator 8, will allow the richly impregnated air to flow through the generator through the mixing chamber to supply the burners which may be instantly lighted when all the parts are cold, the burners or mantles 7 being heated to incandescence to generate intense heat which will not only heat the generator 8 but also the valve stem 21 which is of expansible material so that it will grow or expand longitudinally causing the valve 20 to seat upon the seat 19, closing off the air supply through port 16 while the port 15 remains open. The pressure of the air in chamber 11 will now become effective to force liquid fuel into the generator and since the generator is heated, the liquid will be fed into the mixing chamber in the form of vapor where it will combine with the air passing through tube 13 to support combustion.

By practicing the method disclosed herein and by utilizing the mechanism or its equivalent, the carbureted air from space 11 may first be used as fuel, dispensing with the necessity of preheating any of the parts before the fuel is combusted at the burner. In view of the fact that the air will be cut off just as soon as the generator is hot enough to vaporize the liquid very little pressure will be lost from chamber 11, the pressure remaining being sufficient to force the liquid into the generator 8. If the burner should blow out or become extinguished, the thermostat 21 will cool, then the spring will unseat the valve 20 allowing the air pressure to exhaust through the open generator. Hence danger of the pressure forcing raw liquid out through the burner or burners will be eliminated.

It will be seen that a lamp constructed in accordance with my invention will enable the operator to immediately ignite the fuel at the burners without any preheater and that only so much pressure will be lost as is represented by the amount of carbureted air required to heat the generator to vaporizing temperature.

What I claim and desire to secure by Letters Patent is:—

1. In a device of the class described, a font having a liquid space and an air space above the same to contain liquid fuel under pressure, a fitting in the wall of the font having a main port and two branch ports, one of which admits air to the main port and the other of which admits liquid to the main port, an air tube carried by the fitting, a mixing chamber at the top of the air tube, a burner carried by the mixing chamber, a valved generator communicating the main port with the mixing chamber, and a thermostatic valve for the air branch port responsive to heat from the burner to close the air port branch only under action of heat from the burner.

2. In a device of the class described, a font having a liquid space and an air space above it, a fitting in the wall of the font having a fuel passage-way provided with an air branch port and a liquid fuel branch port communicating the passage-way with the air space and with the liquid in the font, a vapor generator communicating with the passage-way in the fitting, a valve for controlling the same, and a thermostatic valve normally unseated to permit air to flow from the air space through the passage-way into the generator, said valve operating under the action of heat to close the air branch port to thereafter permit liquid only to flow to the generator through the passage-way in the plug.

3. In a device of the class described, a font having a liquid space and an air space above it, means for introducing air into the air space under pressure, a fitting in the wall of the font having a main passage-way, an air port communicating the air space with the main passage-way and a liquid port communicating the liquid space with the main passage-way, a burner above the fitting, a valved vaporizing generator communicating with the main passage-way for supplying vaporized fuel to the burner, a part of the generator being adjacent to the burner, and a thermostatic valve normally unseated but movable into closing position in response to heat from the burner to close the air port so that thereafter only liquid will flow to the generator due to the pressure of air in the air space above the liquid.

In testimony whereof I affix my signature.

WILLIAM C. COLEMAN.